(12) United States Patent
Schaub

(10) Patent No.: US 6,584,654 B1
(45) Date of Patent: Jul. 1, 2003

(54) T-BOLT HOSE CLAMP

(75) Inventor: Erwin Schaub, Jacksonville, FL (US)

(73) Assignee: Epicor Industries, Inc., Denver, CO (US)

( * ) Notice: Subject to any disclaimer, the term of this patent is extended or adjusted under 35 U.S.C. 154(b) by 0 days.

(21) Appl. No.: 10/125,721

(22) Filed: Apr. 18, 2002

(51) Int. Cl.[7] .................. B65D 63/02; F16L 33/22
(52) U.S. Cl. .................. 24/279; 24/19; 24/274 R; 24/271; 285/112; 285/410
(58) Field of Search .................. 24/279, 274 R, 24/271, 19, 305, 495; 411/41; 285/112, 114, 410, 419, 367

(56) References Cited

U.S. PATENT DOCUMENTS

| | | |
|---|---|---|
| 973,466 A | 10/1910 | Beegen |
| 2,852,832 A | 9/1958 | Jones |
| 2,940,151 A * | 6/1960 | Skelly .................. 24/279 |
| 2,941,273 A * | 6/1960 | Skelly .................. 24/279 |
| 3,010,172 A * | 11/1961 | Kaplan .................. 24/279 |
| 3,233,922 A | 2/1966 | Evans |
| 3,303,669 A | 2/1967 | Oetiker |
| 4,172,607 A | 10/1979 | Norton |
| 4,237,584 A | 12/1980 | Oetiker |
| 4,299,012 A | 11/1981 | Oetiker |
| 4,312,101 A | 1/1982 | Oetiker |
| 4,315,348 A | 2/1982 | Oetiker |
| 4,365,393 A * | 12/1982 | Hauffe et al. .................. 24/279 |
| 4,622,719 A | 11/1986 | Rasmussen et al. |
| 4,667,375 A | 5/1987 | Enlund |
| 4,763,695 A | 8/1988 | Dooley |
| 4,795,199 A | 1/1989 | Gehring et al. |
| 5,137,305 A | 8/1992 | Straub |
| 5,329,673 A | 7/1994 | Mason |
| 5,377,389 A | 1/1995 | Calmettes et al. |
| 5,411,162 A | 5/1995 | Koziczkowski et al. |
| 5,630,255 A | 5/1997 | Eliasson |

* cited by examiner

Primary Examiner—Victor Sakran
(74) Attorney, Agent, or Firm—M. S. Olson, Esq.; C. H. Castleman, Esq.; S. G. Austin, Esq.

(57) ABSTRACT

A T-bolt hose clamp comprising an outer band portion for encircling a portion of the circumference of a hose; a T-bolt member and a bridge extending from a first end of the band portion to and opposing second end of the band portion, wherein an inward projecting rib is provided along at least a portion of the outer band portion, having at least a radially innermost portion in substantially the same cross-sectional plane as the inner surface of the bridge.

9 Claims, 3 Drawing Sheets

T-BOLT HOSE CLAMP

The present invention relates generally to a hose clamp, and particularly to a hose clamp of the "T"-bolt variety.

Hose clamps are conventionally employed to seal the connection between a hose or tubing and a cylindrical fitting or nipple. The clamps encircle at least a portion of the outer circumference of a hose disposed about a fitting, and are caused to constrict, i.e., to impart a radially inward directed compressive force to seal the hose to the fitting. Hose clamps of the "T"-bolt variety are also known, and examples thereof are described for instance in U.S. Pat. Nos. 2,852,832 and 5,329,673. The utilization of T-bolt clamps presents many advantages over other types of hose clamp, including that of being generally adjustable over a range of hose diameters and of accommodating relatively higher loads than other clamp types, such as those employing worm-type or screw connections, or deformable ear type constricting members.

T-bolt clamps conventionally comprise an outer generally resilient thin band portion for encircling a greater portion of the outer circumference of a hose and having opposing ends bent radially outward and upon themselves to form opposing looped band ends, and a T-bolt extending between the opposed looped band ends through apertures therein, tightening of which forces the looped ends to draw toward one another thus reducing the band's circumference to constrict the band about the outer circumference of the hose. The incorporation of a bridge member in T-bolt clamp constructions, comprising generally resilient thin shorter length strip for extending along the outer circumference of the hose between the outer band's opposed band ends and radially inward of the T-bolt, is known. These bridge members have been employed in T-bolt clamp configurations for preventing or reducing the incidence of the formation of a bulge, or a portion of the hose wall from moving radially away from the underlying fitting in the region between the band's looped ends as a consequence of the looped ends being drawn together during the clamp tightening process.

A step or ridge is generally formed along the inner circumference of T-bolt clamps incorporating a bridge member between the inner surface of the outer band and the inner surface of the bridge member at either end of the bridge, resulting in an interruption in the sealing pressure that the clamp imparts on the hose. In many instances this interruption does not pose a significant problem since a relatively lower modulus hose material can generally fill the gap formed by this step with tightening of the clamp. This is generally also the case where relatively thicker walled hose, of e.g., 0.25 inches in thickness or more is employed.

This step or ridge can be problematic however in applications involving relatively higher modulus hose materials, e.g., textile-reinforced hose, and/or relatively thin-walled hose, wherein the hose's ability to fill the gap formed by the step is restricted. In such cases, this interruption in sealing pressure can lead to increased risk of leakage or hose damage. For example, where in the instance of a conventionally dimensioned T-bolt clamp the step between the inner surface of the band and the inner surface of the bridge is approximately 0.025 inches, but the relevant hose wall thickness is only 0.090 inches, a sufficient amount of hose material to fill the gap formed by the step with tightening of the clamp is not generally available.

Prior attempts at providing a T-bolt clamp capable of maintaining uniform radial compressive force around a hose circumference have involved the utilization of a flexible inner liner for circumscribing the hose in a position beneath the clamp's outer band, and having a tongue portion at either end thereof for mating engagement with the tongue at the liner's opposite end, such as described for example in aforementioned U.S. Pat. No. 2,852,832. The utilization of an inner liner has certain disadvantages compared to the utilization of a bridge, including the added material costs and labor steps required with inner liners that must extend around the entire circumference of the hose. In addition, the increased length of the inner liner compared to the relatively short bridge member involves greater complexity in terms of assembly and maintenance to ensure proper alignment of the liner beneath the outer band.

SUMMARY OF THE INVENTION

The present invention provides a T-bolt hose clamp comprising a band member for encircling a portion of the outer circumference of an underlying hose, and comprising a radially outward facing surface and a radially inward facing surface, a length extending from a first band end to an opposing second band end, each end having a portion turned outward to form an opposing loop member, and a width extending from a first lateral band edge and an opposite second lateral band edge; a bolt member for extending between the loop members, and comprising a transverse portion and a shank portion; and a bridge member for extending from the band's first end to its second end in a position radially inward of said bolt member, and comprising a radially inward facing surface and a radially outward facing surface, a first bridge end and an opposite second bridge end, wherein a portion of the bridge's radially outward facing surface is in opposing relation to at least a portion of the inward facing surface of said band member; and wherein the band member possesses at least one radially inward projecting rib extending longitudinally along at least a portion of the band from the point at which the inner surface of the band meets each bridge end, and being formed such that in the clamp's engaged position about the hose, at least a radially innermost portion of the rib is in substantially the same cross-sectional plane as the inner surface of the bridge.

In a further embodiment, the bridge of the clamp is provided with at least one aperture extending inward from at least one bridge end, which aperture is formed and arranged to slidingly receive the rib of the band as the clamp is tightened in place such that at least a portion of the rib extends within at least a portion of the aperture.

In yet another embodiment, the band is provided with two such longitudinally extending ribs, each such rib being located at an opposing band lateral edge, and the bridge is provided with two complementary apertures for slidingly receiving the ribs. In a further embodiment, the bridge is provided with a reduced width portion at least one bridge end, the lateral periphery of which defines in each case a boundary of one of two apertures so formed in the bridge member.

DESCRIPTION OF THE DRAWINGS

In the accompanying drawings, like numerals denote like parts, and.

DETAILED DESCRIPTION

Figure 1:
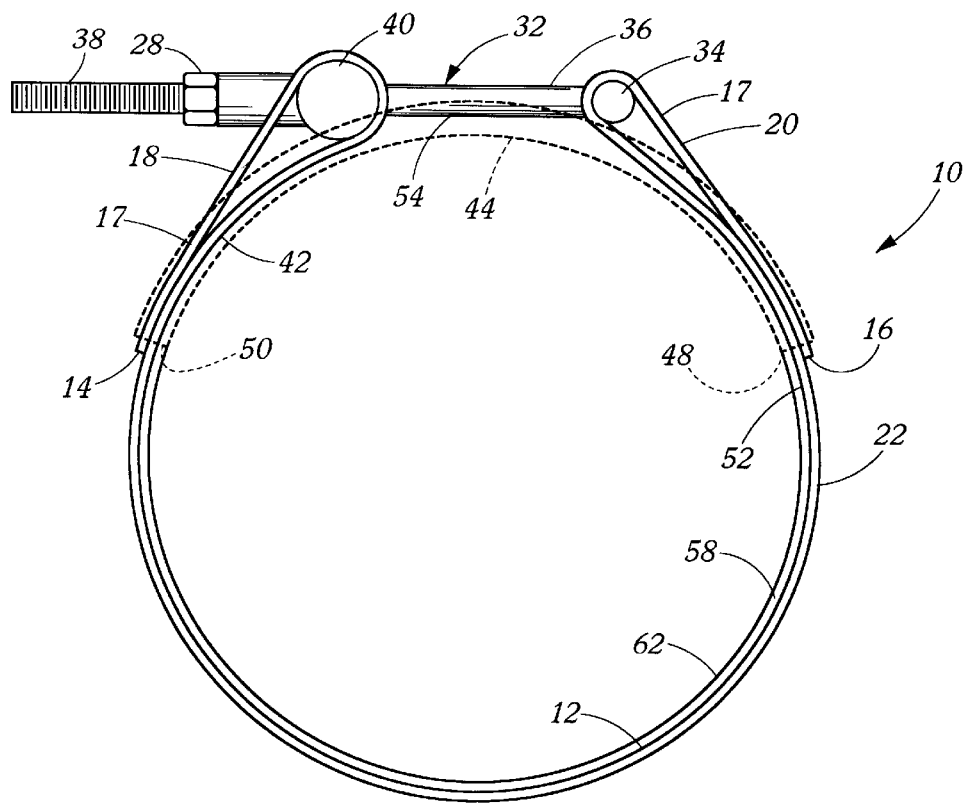
FIG. 1 is a sideview of a T-bolt clamp in accordance with an embodiment of the present invention.
Figure 2:
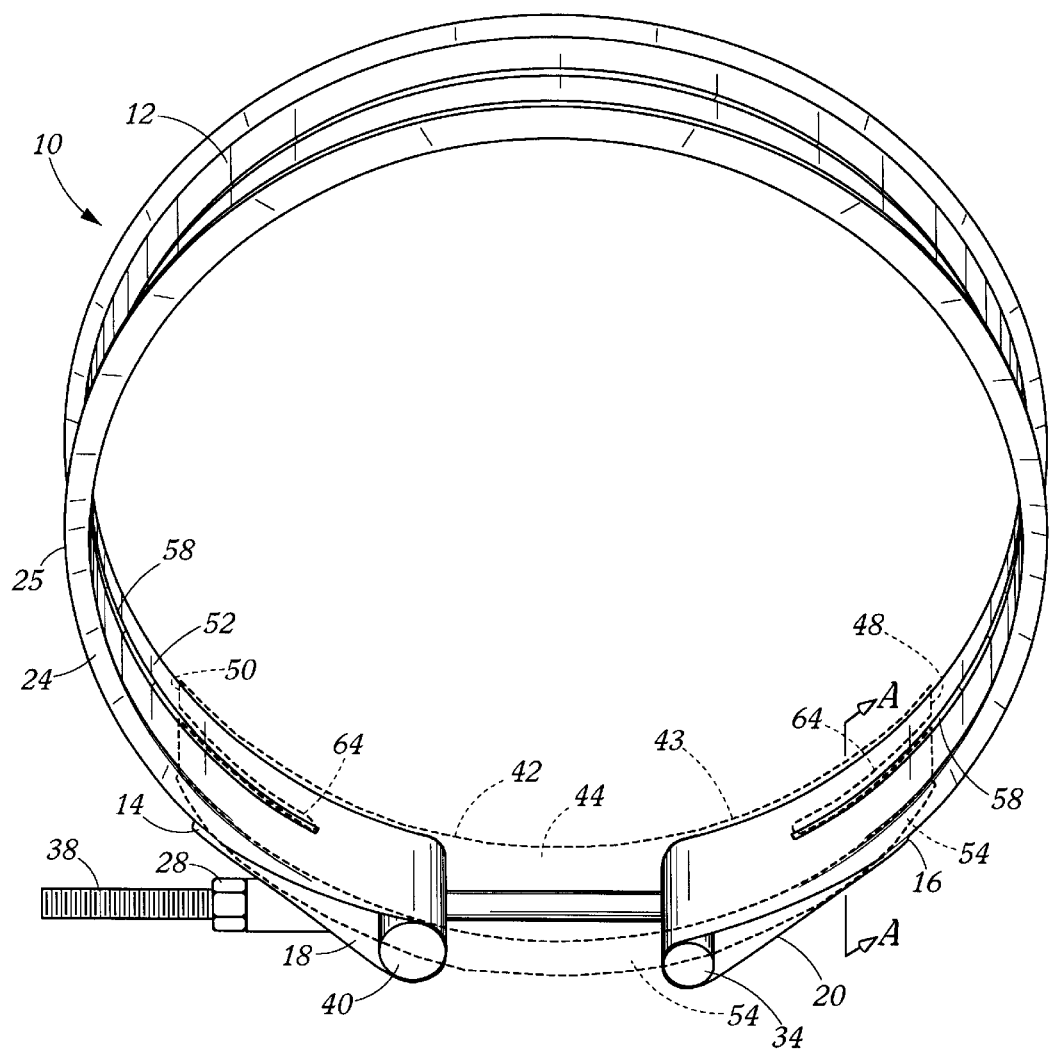
FIG. 2 is a perspective view of the T-bolt clamp of FIG. 1 in accordance with an embodiment of the present invention.

Referring to FIGS. 1 and 2, a hose clamp in accordance with an embodiment of the present invention is generally indicated at 10. In use, the clamp 10 is disposed in circumscribing relation to a hose (not shown but conventional), which in turn is disposed about a nipple or other fitting (not shown but conventional). The hose clamp includes an outer band 12 having a first end 14 and a second end 16, which may be formed of any suitable and/or conventional generally resilient material, including stainless steel. The band 12, proximal its longitudinal ends 14,16, includes radially outward extending portions 17 that are turned back upon themselves as is known in the art to form opposing loops 18, 20 respectively. The turned back portions 17 are optionally attached to the outer surface 22 of the band 12 such as by welding at one or more points, or can be attached to one another by any suitable and/or conventional means, e.g, chemical affixation as by bonding with an adhesive, or mechanical affixation as by clipping. In an alternative arrangement in accordance with an embodiment of the present invention, one or both of the loops 18, 20 may be formed of a piece separate from that forming the band 12. In such instance each such separate loop could be attached as by welding or otherwise at the appropriate point on the outer surface 22 of the band 12.

Figure 3:
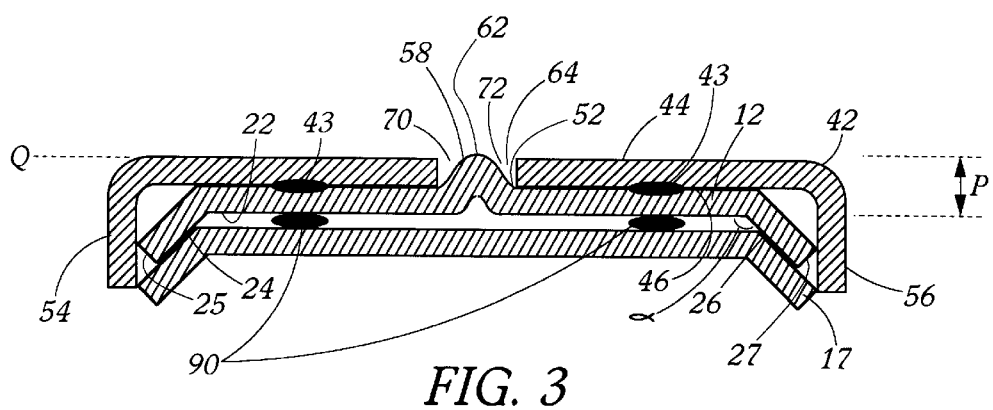
FIG. 3 is a sectional view of the T-bolt clamp of FIG. 2, taken along A—A thereof.

The band is optionally provided with generally radially outward angled flare portions 24, 26 along at least a portion of the lateral edges 25, 27 thereof as shown in cross-section in FIG. 3. While not necessary in the practice of the present invention, these flares 24, 26 have been found to provide improved distortion resistance to the band when it is rolled from a flat configuration into a cylindrical shape as required in the application, and moreover reduce the possibility of damage to the underlying hose by the band's lateral edges 25, 27 as the clamp is tightened into place. The flares may be formed at any suitable or desirable angle α to the plane of the adjacent belt body, which angle may for example be in the range of from about 10° to about 40°, or from about 20° to about 30°. The flares may moreover be formed to initiate at any suitable or desirable distance inward from the lateral edges 25, 27 of the band, e.g., of from about 0.1250 inches to about 0.21875 inches therefrom, or from about 0.1000 inches to about 0.0500 inches therefrom. The flares, when incorporated in the practice of the present invention, may moreover be formed along one or both lateral edges 25, 27 of the band, and when incorporated along both lateral edges, may be of the same or of different angles α, and may initiate at the same- or different distance inward from the respective lateral edge 25, 27 in which each is formed. In one embodiment of the present invention wherein the band 12 is formed to be 0.750 inches wide, flares may beneficially be formed to initiate at a point approximately 0.0625 inches inward from each lateral edge 25, 27 of the band 12, and to be at an angle α of about 25°.

The loops 18, 20 are each provided with apertures of any suitable and/or conventional dimension and configuration for accepting opposite ends of a "T" bolt member 32 or other connection means, which in the illustrated embodiment extends generally from the loops 18, 20 provided proximal either end 14,16 of the band 12. One example of the engagement of a T-bolt member in opposing looped ends of a T-bolt clamp band is shown in aforementioned U.S. Pat. No. 2,857,832, the contents of which with regard to same is hereby incorporated by reference. The "T" bolt member 32 includes a transverse portion 34 and a shank portion 36 having a shank extremity 38. The transverse portion 34 journals within the loop 20 through an aperture therein (not shown but conventional), and the shank portion 36 extends through this same aperture, across the space between the band's loops 18, 20, through an aperture (not shown but conventional) in the opposing loop 18, and is slidably received in a generally annular trunnion 40 of any conventional or suitable construction. The shank extremity 38 extending through the trunnion 40 is provided with threads or other suitable engagement means. A nut 28 or other complementary engagement means is threaded or otherwise applied to the shank extremity 38. In applying the clamp 10 about an underlying hose, tightening of the nut 28 causes the respective band loops 18, 20 to draw one to the other, thereby constricting the inner diameter of the band about the underlying hose as is well known.

The clamp 10 further comprises a bridge 42 extending generally between the opposing loops 18, 20 in a position radially inward of the bolt member 32, and comprising a radially inward facing surface 44 and a radially outward facing surface 46, a first bridge end 48 and a second bridge end 50. The bridge 42 may similarly be formed of any suitable and/or conventional generally resilient material, including stainless steel. As assembled, a portion of the bridge's radially outward facing surface 46 is in opposing relation to at least a portion of the inward facing surface 52 of the outer band 12 as shown.

The bridge 42 may optionally be attached at one end 48 to the band, such as by welding the outer surface 46 of the bridge 42 to the inner surface 52 of the band 12, e.g., proximal end 16 at weld points 43. Where the bridge 42 is so attached, as shown in FIG. 1, tightening of the T-bolt member 32 (by means of, e.g., threading a nut engaged thereto) draws the ends 14, 16 of the band 12 toward one another, with the first end 14 sliding along the radially outward facing surface 46 of the bridge 42. In an alternative arrangement described in further detail below, the bridge may be unattached to the band (hereinafter referred to as a "floating" bridge), such that with tightening of the T-bolt in applying the clamp to an underlying hose, the floating bridge is positioned to slidingly engage both band ends, not necessarily but beneficially to substantially the same extent, and a portion of the bridge extends beneath a portion of the band at either band end.

In the embodiment shown in FIGS. 1–3, the bridge 42 is moreover provided with radially outward projecting flanges 54, 56 along the respective lateral edges thereof. While not necessary in the practice of the present invention, these flanges 54, 56 generally provide improved radial pressure in the region between the loops 18, 20 by restricting the bridge's tendency to buckle under the force generated by the tightening of the T-bolt member 32 in applying the clamp 10 to the underlying hose.

In accordance with an embodiment of the present invention illustrated in FIGS. 1 and 2, the band 12 possesses a radially inward projecting rib 58 extending longitudinally along at least a portion of the band 12 from the point at which the bridge end 48, 50 terminates in a position adjacent the inner surface 52 of the band 12. As illustrated in FIG. 3, the rib 58 is formed to have a certain height P such that in the clamp's engaged position about an underlying hose, at least the innermost portion 62 of the rib 58 is in substantially the same cross-sectional plane Q as the inner surface 44 of the bridge 42.

In accordance with an embodiment of the present invention, a uniform radius of the T-bolt clamp is achieved about the circumference of the hose, and thereby the risk of the aforementioned potential leakage and hose damage problems is significantly reduced, through the creation of an inward-projecting rib 58 in the clamp's outer band 12, which is formed and arranged so that it extends along the band from at least from the point at which the bridge end(s) 48, 50 terminates at a position adjacent the inner surface 52 of the band 12; and so that the rib 58 possesses at least a radially innermost portion 62 which is in substantially the same cross-sectional plane Q as the inner surface 44 of the bridge 42 when the clamp 10 is in its engaged position about the hose.

In the practice of the present invention, it may be desirable or convenient that a greater portion of the rib 58 than that defining its radially innermost portion 62 be in the same plane as the inner surface 44 of the bridge 42. One of ordinary skill in the art would readily recognize that this may be the case for example where an area of greater sealing pressure, as thus defined by the rib's innermost portion 62 in a position radially inward of the cross-sectional plane Q of the inner surface 44 of the bridge 42, is desired.

In a further embodiment of the present invention illustrated in FIGS. 2 and 3, the bridge 42 is optionally provided with an aperture 64, the term being utilized in the present context as conventionally recognized to denote an opening, gap or slot. The aperture 64 may optionally be elongate as shown, and thus extends inward any suitable or convenient distance from each bridge end 48, 50, as shown in FIG. 1. In accordance with an embodiment of the present invention, the aperture 64 is provided with the appropriate dimensions for slidingly accepting the rib 58 in the band 12 as the clamp 10 is tightened in place such that at least a portion of the rib 58 extends within at least a portion of the aperture 64, as shown.

The engagement of the rib 58 within a complementary aperture 64 in the bridge 42 as illustrated in FIGS. 1–3 provides beneficial diameter adjustment characteristics to the T-bolt clamp in accordance with an embodiment of the present invention. One of ordinary skill in the relevant art would readily recognize that where an inward projecting rib 58 is provided in a band 12 for use with a bridge 42 in the absence of a complementary aperture therein in accordance with an embodiment of the present invention, the T-bolt clamp possess the uniform radius characteristic at a single clamp diameter: that at which the rib 58 abuts the respective bridge ends 48, 50.

Conversely, as illustrated in FIGS. 1–3 and as can be observed particularly well in FIG. 1, the uniform radius characteristic is achieved in T-bolt hose clamps in accordance with an embodiment of the present invention involving the aforementioned complementary rib and aperture configuration at any diameter in which a portion of the rib 58 extends into the aperture 64. One of ordinary skill in the relevant art would readily recognize that the smallest diameter such clamp could reach in accordance with this embodiment of the present invention while retaining the uniform radius characteristic, would be that diameter at which the rib 58 extends axially within the full length of the aperture 64, as illustrated for example with respect to the rib's 58 engagement with the aperture 64 in both bridge ends 48, 50 in FIG. 2.

The skilled practitioner would readily appreciate the appropriate dimensions for T-bolt clamp members for use in a given environment and/or application in accordance with the description provided herein for various embodiments of the present invention. While the curved inner- and generally angled outer cross-sectional shape of the rib 58 shown in the illustrated embodiments has been found to be advantageous within the practice of embodiments of the present invention and is moreover straightforward and economical to achieve in flat steel bands through, e.g., applying a suitably shaped male punch to the band's surface 52 while the band is supported in an open channel in accordance with conventional embossment processes, alternative cross-sectional configurations may equally well be employed in the practice of further embodiments of the present invention to provide the rib with other cross-sectional configurations such as squared. One of ordinary skill in the art would readily recognize that a rib having a squared cross-sectional shape would moreover more fully fill the lateral gap formed by the aperture 64 as shown for example in FIG. 1. In practice however it has been found that the small lateral gap 70, 72 on either side of the innermost portion 62 in accordance with the illustrated embodiment has not presented any appreciable practical disadvantage on the T-bolt clamps constructed in accordance with this embodiment of the present invention. Moreover, the rib(s) provided in the outer band in accordance with the present invention may be located at any convenient or otherwise suitable lateral position along the band. Thus for example a rib may be provided in substantially the center of the band as shown in FIGS. 2 and 3, but one may be provided closer to one or the other of the band's lateral edges as desired or convenient. In addition, while in the embodiments illustrated herein apertures 64 are provided at both ends 48, 50 of the bridge 42, one or more bridge apertures as desired for slidingly receiving and/or otherwise engaging one or more ribs in the band may alternatively be provided in only one end of the bridge 42.

The rib 58 and aperture 64 may be formed to have any convenient or suitable dimensions. In a non-limiting example employing a band 12 possessing a conventional width of about 0.750 inches and a thickness (or gauge) of about 0.025 inches and a bridge member 42 similarly having a gauge of about 0.025 inches, the rib 58 may be formed in accordance with conventional embossment processes as described hereinabove to have a height P of about 0.050 inches; and the aperture 64 may be formed to have a width of about 0.075 inches to accommodate the rib 58.

Figure 4:
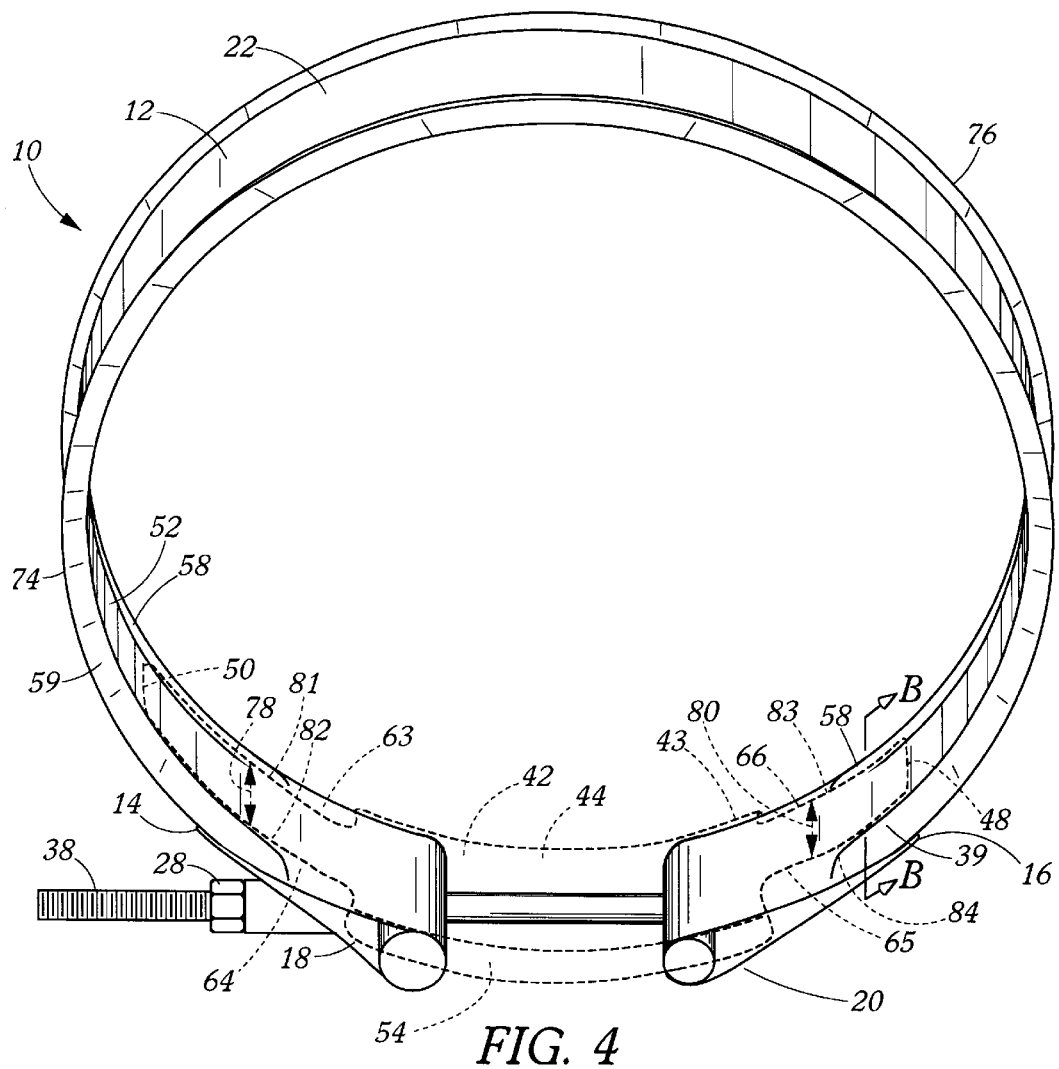
FIG. 4 is a perspective view of a T-bolt clamp in accordance with a further embodiment of the present invention.
Figure 5:
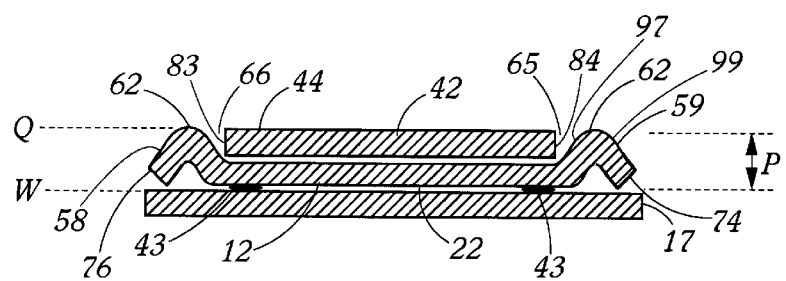
FIG. 5 is a sectional view of the T-bolt clamp of FIG. 4, taken along B—B thereof.

Turning now to a further embodiment of the present invention illustrated in FIGS. 4 and 5, a T-bolt clamp 10 is shown comprising a band 12, which is provided with two longitudinally extending ribs 58, 59 each rib 58, 59 being located at and extending along an opposing band lateral edge 74, 76. In this illustrated embodiment, the bridge 42, which again may be attached to the underlying band 14 as by spot-welding or may conversely be unattached thereto, is optionally provided with a reduced width portion 78, 80 at one or both ends 48, 50 of the bridge in accordance with this embodiment, and preferably in those instances wherein the bridge 42 is welded or otherwise attached to the band 12 at band end 16, at least the bridge end 50 at which sliding engagement with the band 12 occurs with tightening of the clamp. In accordance with an embodiment of the present invention, the lateral ends of the bridge 42 at the reduced width portions 78, 80 define the laterally inner boundaries 81, 82, 83, 84 of the bridge's apertures 63, 64, 65, 66. The materials and/or dimensions of the various components in accordance with this embodiment of the present invention, including the band 12, the bridge 42, ribs 58, 59 and apertures 63, 64, 65, 66, may be selected by one of ordinary skill in the art as convenient or suitable for a given application, and may include those described above with regard to the foregoing illustrated example. Thus in a non-limiting example employing a band 12 possessing a conventional width of about 0.750 inches and a thickness (or gauge) of about 0.025 inches and a bridge member 42 similarly having a gauge of about 0.025 inches, the ribs 58, 59 may be formed in accordance with conventional embossment processes as described hereinabove to have a height P of about 0.050 inches; and the apertures 63, 64, 65, 66 may be formed, e.g., by forming the reduced width portion 78, 80 of the bridge to have a width of approximately 0.600 inches, thus yielding an aperture of about 0.075 inches at each lateral edge of the bridge to accommodate the associated rib 58, 59.

Again, the ribs 58, 59 in accordance with this embodiment are provided with the appropriate dimensions so that they extend at least from the point at which each bridge end 48, 50 terminates in a position against the radially inward facing surface 52 of the band 12; and at least the ribs' most radially inward projecting portion 62 is in the same cross-sectional plane Q as the inner surface 44 of the bridge 42 when the clamp 10 is in its engaged position circumscribing the underlying hose. In the particular embodiment illustrated in FIGS. 4 and 5 however the ribs 58, 59 extend along at least a portion of the length of the bridge's apertures 63, 64, 65, 66, and comprise an inward projecting component 97, the aforementioned radially innermost portion 62, as well as a generally radially outward projecting component 99. The beneficial uniform radius characteristic is thus achieved in T-bolt hose clamps in accordance with this illustrated embodiment of the present invention at any diameter of the clamp in which a portion of the ribs 58, 59 abut the bridge end 48, 50 or extend into the associated aperture 63, 64, 65, 66.

One of ordinary skill in the relevant art would readily recognize that the utilization of the aforementioned floating bridge in accordance with an embodiment of the present invention incorporating the dual-rib characteristic as described above with reference to FIGS. 4 and 5, but equally applicable to configurations having only one band rib as described above with reference to FIG. 1, or having additional band ribs, would moreover provide the beneficial constant radius characteristic over an even greater potential clamp diameter range than the embodiments of the invention employing a bridge attached at one end to the underlying band. In particular, by providing a reduced width portion 78, 80 at either bridge end 48, 50 as shown in FIG. 4, and ensuring that at least some axial extension of the rib 58, 59 along or within the boundaries 81, 82, 83, 84 of the bridge's apertures 64, 65 is achieved, a constant radius of the clamp could be achieved over a wide range of diameters.

As shown particularly in FIG. 5, the embodiment of the present invention illustrated in FIGS. 4 and 5 creates in effect redundant high-pressure sealing rings defined by the respective peaks 62 of the ribs 58, 59 about the circumference of the underlying hose, and moreover provides the additional benefit of combining the benefits of the flare feature described above with regard to the embodiment of the invention illustrated in FIGS. 1 and 2, with the rib feature in accordance with embodiments of the present invention. That is, the band's outward projecting ribs 58, 59 in the embodiment shown in FIGS. 4 and 5 have been found to provide substantially the same function as the outward extending flares 24, 26 incorporated in the band 12 illustrated in FIGS. 1 and 2. Thus, improved band distortion resistance and reduced risk of damage to the underlying hose member are achieved in this particular embodiment of the present invention without the need for further shaping the band material to provide it with additional flares.

The ribs 58, 59 provided along at least a portion of at least one of the lateral edges 74, 76 of the band as illustrated in FIGS. 4 and 5 in accordance with an embodiment of the present invention moreover provide an additional benefit. As noted above, the turned back portions 17 of the band ends 14, 16 are typically attached to the outer surface 22 of the band 12 to form opposing loops 18, 20 such as by welding, e.g., at one or more points 43 as shown, i.e., "spot-welding". The overlap of opposing portions of the bands each incorporating outward extending flares as described above in order to weld the opposing surfaces together can result in a nesting problem, as shown in cross-section in FIG. 3. That is, the flare portions 24, 26 at the lateral edges 25, 27 of the band may potentially interfere with intimate surface contact of the relevant opposing band surfaces, resulting in undesirable voids therebetween and potentially unacceptable surface contact between the relevant surfaces to be welded to one another. This could be resolved by trimming away, i.e., narrowing, that portion 17 of the band end disposed against the opposing portion thereof in its looped configuration, so that the so-narrowed portion nests within the radially outward projecting flares along the lateral edges of the opposing portion. This configuration has the drawback however of weakening the band end at the narrowed portion.

A further aspect of an embodiment of the present invention addressing this particular matter is illustrated in FIG. 5, illustrating in cross-section a portion of the hose clamp shown in FIG. 4, at one of the band end loops 18. As noted above, the turned back portions 17 of the band ends 14, 16 are optionally but typically attached to the outer surface 22 of the band 12 to form opposing loops 18, 20 such as by spot-welding at point(s) 43. Where, in accordance with an embodiment of the present invention incorporating the dual-rib construction as illustrated in FIG. 4 and described with reference thereto above, two inward projecting ribs 58, 59 are formed in the band 12, a portion of the band 12 proximal each of its ends 14, 16 and forming the outer component 17 of the loop 18, 20 is optionally provided with a substantially flat cross-sectional configuration as shown, such that it presents a substantially flat surface in the area at which such outer component or folded-back portion 17 of the band is welded, bonded or otherwise affixed as indicated in FIG. 5 at 43 to the opposing band outer surface portion 22. As shown in cross-section in FIG. 5, the ribs 58, 59 in accordance with an embodiment of the present invention comprise an inward projecting component 97, a radially innermost portion 62, as well as a generally radially outward projecting component 99, the latter of which optionally but beneficially does not extend beyond the cross-sectional plane W of the outer surface 22 of the band 12. This particular aspect of an embodiment of the present invention substantially ensures that the relevant band surfaces can be acceptably mated to one another for welding or other suitable affixation without interference by opposing flared portions to form the loops 18, 20 while preserving the flared lateral edge advantages described above with reference to the embodiments shown in FIGS. 1–3.

Although the present invention has been described in detail for the purpose of illustration, it is to be understood that such detail is solely for that purpose and that variations can be made therein by one skilled in the art without departing from the spirit or scope of the present invention except as it may be limited by the appended claims. The invention disclosed herein may suitably be practiced in the absence of any element not specifically disclosed herein.

What is claimed is:

1. A hose clamp for clamping a hose about a fitting, the hose clamp comprising:

a) a band member for encircling a portion of the outer circumference of said hose, and comprising a radially outward facing surface and a radially inward facing surface, a length extending from a first band end to an opposing second band end, said first end being turned outward to form a first loop member and said second end being turned outward to form an opposing second loop member, and a width extending from a first lateral band edge and an opposite second lateral band edge;

b) a bolt member for extending between said first loop member and said second loop member, and comprising a transverse portion and a shank portion;

c) a bridge member for extending from said first band end to said second band end in a position radially inward of said bolt member, and comprising a radially inward facing surface and a radially outward facing surface, a first bridge end and an opposite second bridge end, a portion of said radially outward facing surface being adapted for being disposed against at least a portion of said inward facing surface of said band member;

and characterized in that said band member possesses at least a first radially inward projecting rib extending along at least a portion of said band length from the point at which the inner surface of the band meets each bridge end, and being formed and arranged such that in the clamp's engaged position about the hose, at least a radially innermost portion of the rib is in substantially the same cross-sectional plane as the inner surface of the bridge.

2. The hose clamp of claim 1 wherein said bridge comprises at least one aperture having a length extending inward from at least one of said first bridge end and said second bridge end, for slidably receiving and engaging said rib with tightening of said clamp, such that at least a portion of said rib extends within at least a portion of said length of said aperture.

3. The hose clamp of claim 1 wherein said band further comprises a radially outward projecting flare extending along at least one said band lateral edge.

4. The hose clamp of claim 1 further comprising at least a second radially inward projecting rib extending along at least a portion of said band length from the point at which the inner surface of the band meets each said bridge end, and being formed so that in the clamp's engaged position about the hose, at least the radially innermost portion of said second rib is in substantially the same cross-sectional plane as the inner surface of the bridge.

5. The hose clamp of claim 2 wherein said bridge comprises a reduced width portion having a length extending inward along a portion of the bridge from at least one of said first bridge end and said second bridge end whereby at least one said bridge lateral edge at said reduced width portion forms a boundary of said aperture.

6. The hose clamp of claim 5 further comprising:

a) at least a second radially inward projecting rib extending along at least a portion of said band length from the point at which the inner surface of the band meets at least one said bridge end, and being formed so that in the clamp's engaged position about the hose, at least the radially innermost portion of said second rib is in substantially the same cross-sectional plane as the inner surface of the bridge; and, b) at least a second aperture in said bridge extending axially inward from at least one of said first bridge end and said second bridge end, for slidably receiving and engaging said second rib with tightening of said clamp; whereby at least a portion of said second rib extends within at least a portion of the axial length of said second aperture; and whereby at least one said bridge lateral edge at said reduced width portion forms a boundary of said second bridge aperture.

7. The hose clamp of claim 6 wherein said first rib is provided proximal at least a portion of said first lateral edge of said band and said second rib is provided proximal at least a portion of said second lateral edge of said band.

8. The hose clamp of claim 1 wherein said second end of said bridge is affixed to the inner surface of said band at one of said band ends.

9. The hose clamp of claim 1 wherein at least one of said first loop member and said second loop member comprises an outer folded back portion and an opposing inner portion affixed at at least one point to said outer folded back portion to define a connection point, and wherein said rib extends along only a portion of said band to provide a region of said outer folded back portion comprising said connection point having a substantially flat cross-sectional configuration.

* * * * *